United States Patent
Ikeda et al.

(10) Patent No.: US 7,852,589 B2
(45) Date of Patent: Dec. 14, 2010

(54) DISK DRIVE

(75) Inventors: Masaomi Ikeda, Kanagawa (JP); Takao Matsui, Kanagawa (JP); Masahiko Koizumi, Kanagawa (JP); Masato Taniguchi, Kanagawa (JP); Kohji Nakao, Kanagawa (JP); Hideaki Maeda, Kanagawa (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 822 days.

(21) Appl. No.: 11/796,134

(22) Filed: Apr. 25, 2007

(65) Prior Publication Data

US 2007/0263310 A1    Nov. 15, 2007

(30) Foreign Application Priority Data

Apr. 25, 2006    (JP) ............................ 2006-120868

(51) Int. Cl.
*G11B 5/35*    (2006.01)

(52) U.S. Cl. ............................. 360/65; 360/29; 360/31; 360/39

(58) Field of Classification Search ....................... None
See application file for complete search history.

(56) References Cited

U.S. PATENT DOCUMENTS

| | | | | |
|---|---|---|---|---|
| 5,345,342 A * | 9/1994 | Abbott et al. | ................. | 360/48 |
| 5,886,844 A * | 3/1999 | Shimizu | ...................... | 360/65 |
| 5,898,532 A * | 4/1999 | Du et al. | ....................... | 360/46 |
| 6,046,874 A * | 4/2000 | Takahashi | ..................... | 360/65 |
| 6,359,743 B1 * | 3/2002 | Patti et al. | ...................... | 360/25 |
| 6,437,932 B1 * | 8/2002 | Prater et al. | .................... | 360/46 |
| 6,473,251 B2 * | 10/2002 | Patti et al. | ..................... | 360/25 |
| 6,594,098 B1 * | 7/2003 | Sutardja | ....................... | 360/65 |
| 6,600,617 B1 * | 7/2003 | Zeng | ........................... | 360/68 |
| 7,218,581 B2 * | 5/2007 | Frisson et al. | ............ | 369/44.32 |
| 7,256,954 B2 * | 8/2007 | Serizawa | ...................... | 360/65 |
| 7,606,300 B2 * | 10/2009 | Lim | ............................ | 375/232 |
| 2002/0012185 A1 * | 1/2002 | Sawaguchi et al. | ............ | 360/46 |
| 2003/0053243 A1 * | 3/2003 | Kubota et al. | .................. | 360/75 |
| 2004/0114912 A1 * | 6/2004 | Okamoto et al. | ............ | 386/114 |
| 2007/0052556 A1 * | 3/2007 | Janssen et al. | ................. | 341/50 |

FOREIGN PATENT DOCUMENTS

| | | |
|---|---|---|
| JP | 2004-185807 | 7/2004 |
| JP | 2004-326973 | 11/2004 |

* cited by examiner

*Primary Examiner*—Dismery E Mercedes (57)    ABSTRACT

Embodiments in accordance with the present invention provide a magnetic disk drive capable of achieving error recovery stably in a simple configuration in the event of thermal asperity (TA) and minimizing the error recovery time required, and a method for controlling the disk drive. According to one embodiment, if TA occurs, a cutoff frequency of a high-pass filter to which a data read signal is input is first increased and a loop gain of a low-order finite impulse response (FIR) filter connected in series to an FIR filter is also increased as high as possible. Next, a Viterbi decoder to which a signal is input from the low-order FIR filter provides feedback to the low-order FIR filter so that an input signal error becomes a minimum. Tap coefficients of the low-order FIR filter are thus optimized.

10 Claims, 4 Drawing Sheets

Read ERP table

| NO | ERP step |
|---|---|
| ⋮ | ⋮ |
| k | TA detection<br>Cutoff frequency: High<br>Feedback gain level: 1/16 |
| k+1 | Cutoff frequency: High<br>Feedback gain level: 1/32 |
| k+2 | Offset: F<br>Cutoff frequency: High<br>Feedback gain level: 1/16 |
| k+3 | Offset: F<br>Cutoff frequency: High<br>Feedback gain level: 1/32 |
| ⋮ | ⋮ |

Fig.5

DISK DRIVE

CROSS-REFERENCE TO RELATED APPLICATION

The instant nonprovisional patent application claims priority to Japanese Patent Application No. 2006-120868, filed Apr. 25, 2006 and incorporated by reference in its entirety herein for all purposes.

BACKGROUND OF THE INVENTION

Devices using various types of media such as optical disks, magnetic optical disks, and a flexible magnetic disk, are known in the art as disk drives. Among them, hard disk drives (hereinafter referred to as HDDs) have become popular as storage devices for computers to such an extent that they are one of the storage devices indispensable for modern computer systems. Further, not limited to the computers as described above, HDDs are expanding more and more in application due to their excellent properties. For example, HDDs are used for moving picture recording/reproducing devices, car navigation systems, cellular phones, and removable memories for use in digital cameras.

The magnetic disks used in the HDD each have a plurality of concentrically formed tracks, and each of the tracks is subdivided into a plurality of sectors. Address information on the sector, and user data are stored into each sector. A read/write head can access a desired sector in accordance with the address information of the sector, thus writing data onto or reading out data from the sector.

Before being transmitted to a host, signals that the head has read out from the magnetic disk in a data readout process undergo required signal processing by a finite impulse response (FIR) filter, such as wave shaping and decoding. Typically, the signals from the head are waveform-equalized by the filter and after being converted into digital signals by an A/D converter, these signals are once gain subjected to waveform equalization by the waveform equalizer. Additionally, signals from the waveform equalizer are decoded and demodulated.

In recent years, a perpendicular magnetic recording scheme has been researched as a method of recording on a magnetic disk. The perpendicular magnetic recording scheme allows a stable recording state to be maintained at high recording density as compared with conventional longitudinal (planar) magnetic recording. Perpendicular recording is known as a scheme in which the low-frequency components of data signals contribute to the improvement of error rates. It is possible to prevent the degradation in error rate of perpendicular recording, that is, to obtain an error rate reduction effect, by assigning a low cutoff frequency (low pole frequency) to the high-pass filter of a preamplifier and supplying signals of a frequency equal to or higher than a required value to a PRML (Partial Response Maximum Likelihood) system Viterbi decoder for a read channel.

During the reading of data from a magnetic disk, thermal energy may be generated due to a possible collision between a head and the magnetic disk, causing thermal asperity (TA), which is an event that magnetic resistance changes and the a read signal significantly fluctuates in DC level. If a DC offset of the read signal occurs due to the thermal asperity, the read signal must be immediately returned to its original DC level. Accordingly, if the thermal asperity occurs, an error recovery process has been traditionally performed, which increases the cutoff frequency of the high-pass filter to several megahertz.

In the perpendicular recording scheme, however, the frequency used under normal operating conditions is several hundreds of hertz. Thus, if the cutoff frequency increases to several megahertz during the error recovery process, the frequency significantly changes, thereby extending the time required for the read signal to recover the original DC level. This is because the optimum values for normal error recovery are preassigned as tap coefficients of a transversal filter in the perpendicular recording scheme. That is to say, if TA occurs, the tap coefficients of the transversal filter depart from the respective optimum values for normal error recovery.

This causes the degradation in error rate. For this reason, the use of the perpendicular recording scheme results in the contradiction that the process for error recovery causes the degradation in error rate. If TA occurs, therefore, an error recovery effect cannot be obtained just by increasing the cutoff frequency of the high-pass filter.

For the above problem, there is a method of converging noise by optimizing the tap coefficients of the transversal filter after increasing the cutoff frequency of the high-pass filter in the event of TA. However, the transversal filter, which is to be applied to the PRML system Viterbi decoder, needs to have a high order of magnitude in the number of taps, for example, 16 taps.

In the meantime, calibration becomes a time-consuming task since a large number of data sectors must be read to optimize the tap coefficients stably. As can be understood from these facts, the following two processes cannot be realized simultaneously: optimizing all tap coefficients and converging noise quickly for error recovery within a minimum time. In other words, optimizing all taps requires slow feedback and is likely to result in system divergence if feedback is accelerated.

In the conventional longitudinal magnetic recording scheme, since the frequency used under normal operating conditions is several megahertz, even after the cutoff frequency has been increased as the recovery process associated with TA, a variation in the operating frequency is sufficiently suppressed and the time required for the recovery to the original DC level is not extended.

For these reasons, Japanese Patent Laid-Open No. 2004-326973 ("Patent Document 1") discloses a magnetic disk drive using a perpendicular magnetic recording method with reduced effects caused by TA. The magnetic disk drive described in Patent Document 1 has dual-system data detectors each having a different cutoff frequency. In the drive, the appropriate data detector is selected, depending on whether TA has occurred. That is to say, when TA is detected, a read signal for data which has been written in the perpendicular recording scheme is differentiated before being subjected to data detection.

For Patent Document 1, however, when the cutoff frequency is changed in the event of TA, since the read signal is differentiated to suppress the effects of the DC component, a detection target is also changed, which results in the necessity for changing each tap coefficient as well. Thus, two different types of parameter set are necessary: a parameter set for normal conditions and a parameter set for TA. This requires a large amount of memory capacity.

BRIEF SUMMARY OF THE INVENTION

Embodiments in accordance with the present invention provide a magnetic disk drive capable of achieving error recovery stably in a simple configuration in the event of thermal asperity (TA) and minimizing the error recovery time required, and a method for controlling the disk drive. According to the specific embodiment of the present invention shown in FIG. 2, if TA occurs, a cutoff frequency of a high-pass filter to which a data read signal is input is first increased and a loop gain of a low-order FIR filter 215 connected in series to an FIR filter 214 is also increased as high as possible. Next, a Viterbi decoder 216 to which a signal is input from the low-order FIR filter 215 provides feedback to the low-order FIR filter 215 so that an input signal error becomes a minimum. Tap coefficients of the low-order FIR filter 215 are thus optimized.

DETAILED DESCRIPTION OF THE INVENTION

Embodiments in accordance with the present invention relate to a disk drive, and more particularly, to adjusting a filtering coefficient of a signal which has been read out from a disk drive.

A disk drive according to an embodiment of the present invention includes a head that reads out data from a disk; a low cut filter that selectively uses a first cutoff frequency and a second cutoff frequency to cut off part of a signal transmitted from the head; a waveform control filter that has a plurality of filtering coefficients and controls a waveform of a signal transmitted from the low cut filter; and a filtering coefficient controller that controls the filtering coefficients of the waveform control filter in accordance with a signal from the waveform control filter. When the low cut filter uses the first cutoff frequency, the filtering coefficient controller controls part of the plural filtering coefficients at a first feedback gain level. When the low cut filter uses the second cutoff frequency, the filtering coefficient controller controls the above-mentioned part of the filtering coefficients at a second feedback gain level higher than the first feedback gain level. Since the above part of the filtering coefficients is controlled at a high gain level in response to a change from one cutoff frequency to another, the corresponding filtering coefficient(s) can be rapidly and stably controlled.

The waveform control filter includes a first FIR filter and a second FIR filter which has a smaller number of taps than the first FIR filter. The filtering coefficient controller controls a filtering coefficient of the second FIR filter. Thus, effective response to the frequency change becomes possible. Alternatively, the filtering coefficient controller preferably performs a decoding process on the signal from the waveform control filter and controls the filtering coefficients thereof in accordance with decoding results. This makes effective control of the filtering coefficients possible.

A disk drive according to another embodiment of the present invention includes a head that reads out data from a disk; a low cut filter that selectively uses a first cutoff frequency and a second cutoff frequency to cut off part of a signal transmitted from the head; and a waveform control filter that has a plurality of filtering coefficients and controls a waveform of a signal transmitted from the low cut filter. When the low cut filter uses the first cutoff frequency, the plurality of filtering coefficients are fixed during readout of the data from the disk. When the low cut filter uses the second cutoff frequency, part of the plurality of the filtering coefficients are controlled during readout of the data from the disk. Controlling the part of the filtering coefficients makes rapid and stable control of the corresponding filtering coefficient (s).

The waveform control filter includes a first FIR filter and a second FIR filter which has a smaller number of taps than the first FIR filter, and the part of the filtering coefficients is a filtering coefficient of the second FIR filter. In addition, when the low cut filter uses the first cutoff frequency, the second FIR filter can be in an inactive state.

The low cut filter preferably uses the first cutoff frequency during normal data readout from the disk, and uses the second cutoff frequency during an error recovery process. A quick recovery from a error state can be expected. The first cutoff frequency can be made higher than the second cutoff frequency. This makes the disk drive responsive to TA.

According to embodiments of the present invention, the filtering coefficients can be effectively controlled in response to cutoff frequency changing.

An embodiment to which the present invention can be applied will be described hereunder. In the description below and the accompanying drawings, for clarity of the description, omission and simplification are made as appropriate. Also, the same reference number is assigned to the same constituent element in each drawing. In addition, overlapping description of the same information is omitted as necessary for the clarity of the description below.

Taking a hard-disk drive (HDD) as an example of a magnetic disk drive, a description will be made of an embodiment of the present invention. One of major features of the present embodiment exists in control of filtering coefficients in a read/write channel during a thermal asperity (TA) event. A total configuration of the HDD is first outlined below to facilitate understanding of the above-mentioned feature of the present embodiment.

Figure 1:
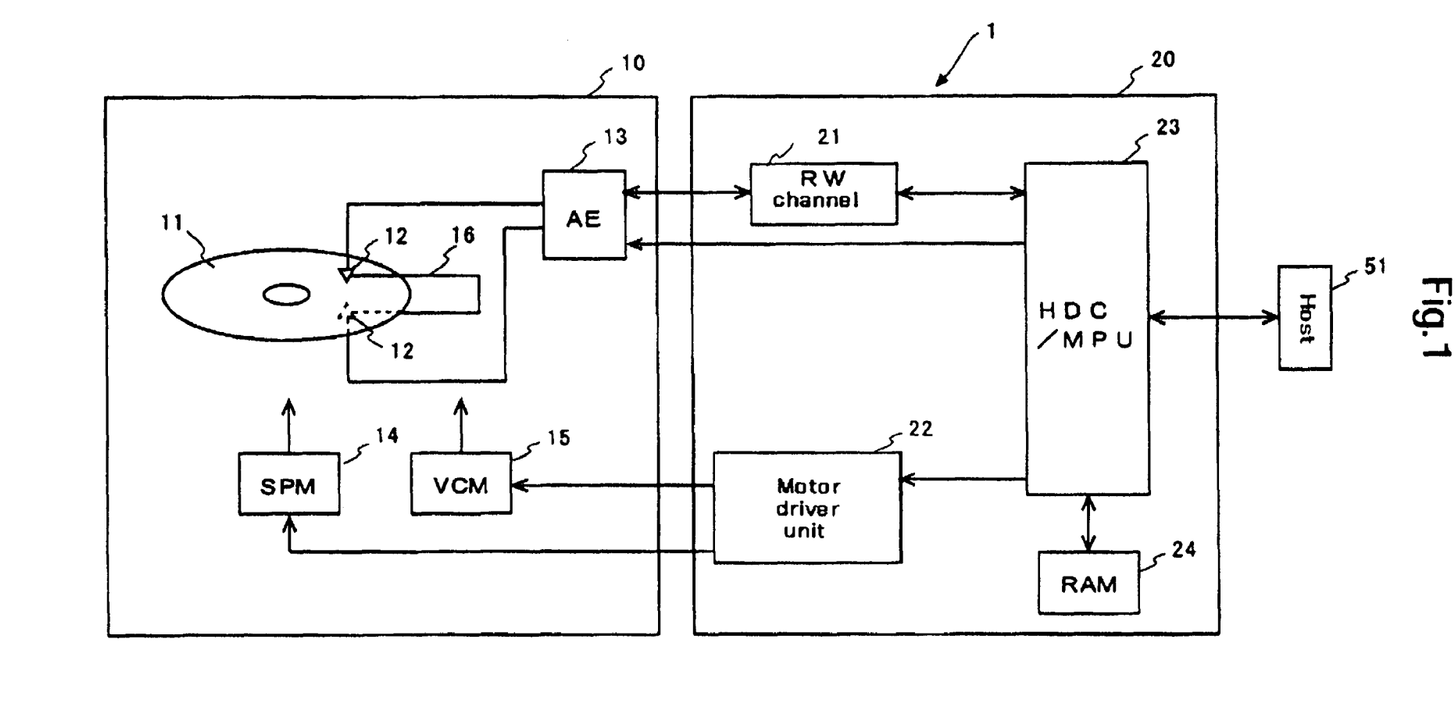
FIG. 1 is a block diagram schematically showing a total configuration of an HDD according to an embodiment of the present invention.

FIG. 1 is a block diagram schematically showing the total configuration of the HDD 1 according to an embodiment of the present invention. As shown in FIG. 1, the HDD 1 includes a circuit board 20 fixed externally to an enclosure 10. A read/write channel (R/W channel) 21, a motor driver unit 22, an integrated circuit 23 including a hard-disk controller (HDC) and a microprocessing unit (MPU) as an integrated structure (hereinafter, this circuit is called the HDC/MPU 23), a RAM 24, and other ICs are mounted on the circuit board 20. Constituent elements of each circuit can be integrated into one IC chip or mounted in a plurality of split IC chips.

A spindle motor SPM 14 rotates a magnetic disk 11 fixed thereto, at a required angular velocity. The magnetic disk 11 in the present embodiment uses perpendicular magnetic recording to store data. Perpendicular magnetic recording is a technique that orients recording magnetization perpendicularly to a recording surface during recording. Perpendicular magnetic recording, unlike planar magnetic recording in which a recording magnetization direction is parallel to a recording surface, allows high recording stability to be achieved at high recording density since a magnetic field erased by an adjacent magnetic domain diminishes with increases in recording density. The motor driver unit 22 drives the SPM 14 in accordance with control data from the HDC/MPU 23. The magnetic disk 11 in the present embodiment has a data-recording surface on both sides, and a head element section 12 is provided for each recording surface.

Each head element section 12, an example of a head, is fixed to a slider (not shown). The slider is fixed to an actuator 16. The actuator 16 coupled to a voice coil motor (VCM) 15 pivotally moves around a pivot, thus moving the head element section 12 (and the slider) in a radial direction of the magnetic disk 11 above the surface thereof. The motor driver unit 22 drives the VCM 15 in accordance with the control data from the HDC/MPU 23. The head element section 12 typically includes a write element that converts an electrical signal into a magnetic field according to write data, and a read element that detects the magnetic field stemming from the magnetic disk 11 and reconverts the field into electrical signal form. The number of magnetic disks 11 can be one or more, and a recording surface can be formed on one side or both sides of each magnetic disk 11. In addition, embodiments in accordance with the present invention can be applied to a data storage device having only a read element.

Arm electronics (AE) 13 selects, from a plurality of head element sections 12, one head element section 12 for accessing data, then preamplifies with a definite gain a read signal reproduced by the selected head element section 12, and sends the read signal to the R/W channel 21. Also, the AE 13 transfers a writing signal from the R/W channel 21 to the selected head element section 12. The AE 13 has a high-pass filter and a low-pass filter, and cutoff frequencies of these filters can be varied. If TA occurs, the AE 13 increases the cutoff frequency of the high-pass filter. This operation is detailed later in this Specification.

During a writing process, the R/W channel 21 that has received write data supplied from the HDC/MPU 23 modulates the write data into a code format, converts the code-modulated write data into writing signal form, and supplies the write signal to the AE 13. During a reading process, the R/W channel 21 that has received read signal supplied from the AE 13 preamplifies the read signal so as to obtain constant amplitude, extracts data from the acquired read signal, and decodes the data. Data that is read out after being decoded includes user data and servo data. The read data that has been decoded is supplied to the HDC/MPU 23. The R/W channel 21 according to the present embodiment has a feature to control filtering coefficients during readout of a data sector in which TA has occurred.

The MPU in the HDC/MPU 23 operates pursuant to microcodes that have been loaded into the RAM 24. As the HDD 1 starts operating, the data required for control and for data processing, in addition to the microcodes operating on the MPU, is loaded from the magnetic disk 11 or a ROM (not shown) into the RAM 24. The HDC is constructed as a logic circuit, and performs various processes integrally with the MPU. For example, the HDC/MPU 23 performs necessary process steps relating to data processing, such as command execution priority management, positioning control of the head element section 12, interface control, and defect management. In addition, the HDC/MPU 23 controls the entire HDD 1.

The HDC/MPU 23, after acquiring from the R/W channel 21 the read data supplied from the magnetic disk 11, transfers the read data to a host 51. The read data from the magnetic disk 11 is temporarily stored into an internal read buffer of the RAM 24, and then the read data is transferred to the host 51 via the HDC/MPU 23. Also, write data from the host 51 is temporarily stored into the internal read buffer of the RAM 24 via the HDC/MPU 23, and then the write data is transferred to the magnetic disk 11 via the HDC/MPU 23 in required timing.

Figure 2:
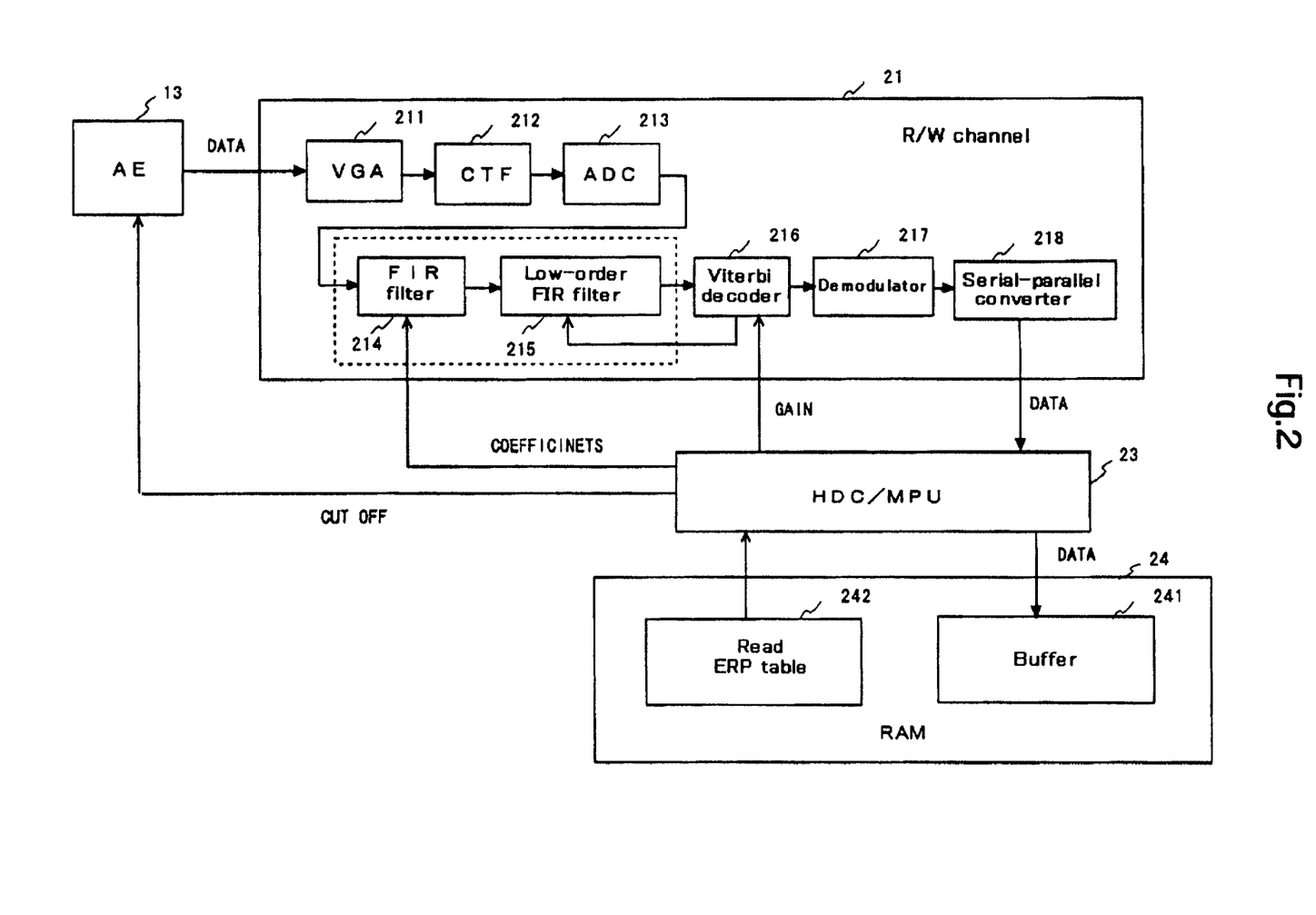
FIG. 2 is a block diagram schematically showing a logical configuration associated with a readout process in an HDD channel according to an embodiment of the present invention.

Next, the control of filtering coefficients by the R/W channel 21 according to an embodiment of the present embodiment is described in detail below. FIG. 2 is a block diagram schematically showing a logical configuration which is associated with a readout process in the HDD 1 according to the present embodiment and with an error recovery procedure (EPR) in the readout process. The R/W channel 21 includes, from a pre-stage in order, a variable gain amplifier (VGA) 21, a continuous time filter (212) as a waveform equalizer, an analog-digital converter (ADC) 213, a digital FIR filter 214, a low-order FIR filter 215, a Viterbi decoder 216 as an example of a filtering coefficient controller, a demodulator 217, and a serial-parallel converter 218. The digital FIR filter 214 and the low-order FIR filter 215 form the configuration of a waveform control filter as an example.

The VGA 211 amplifies an input analog signal as necessary, and provides an output. The CTF 212 equalizes a waveform of the input analog signal. The ADC 213 samples and quantizes the analog signal. The digital FIR filter 214 and the low-order FIR filter 215 conducts a waveform-shaping process on a digital signal. The low-order FIR filter 215 is smaller than the FIR filter 214 in terms of an order of magnitude (in the number of taps). The Viterbi decoder 216 decodes input data. The demodulator 217 demodulates Viterbi decoder signals. The serial-parallel converter 218 converts input serial data into parallel data.

A normal read process is described below. An output from the head element section 12 is amplified by the AE 13 and then input to the VGA 211 that forms an automatic gain controller (AGC). The VGA 211 amplifies an input signal so as to obtain required amplitude of this signal, and outputs the amplified signal to the CTF 212. The CTF 212 has a low-pass filter function. Prior to later signal processing, the waveform equalizer 211 conducts a waveform-equalizing process to remove noise from the input signal and cause the signal waveform to be subjected to slimming. An output from the waveform equalizer 211 is converted into a digital signal during the sampling and quantizing by the ADC 213, from which the digital signal is then input to the FIR filter 214.

In order to restore data accurately, the FIR filter 214 shapes the waveform of the input signal and equalizes the input waveform into a target waveform of a partial response class. The digital signal from the FIR filter 214 is input to the low-order FIR filter 215. The low-order FIR filter 215 corrects frequency characteristics of the input signal. An output from the low-order FIR filter 215 is input to the Viterbi decoder 216.

The Viterbi decoder 216 uses a PRML (Partial Response Maximum Likelihood) processing circuit to process the waveform that has been equalized by the FIR filter 214 and frequency-corrected by the low-order FIR filter 215, and outputs an RLL (Run Length Limited) signal. In accordance with a required algorithm, the Viterbi decoder 216 can determine a maximum-likelihood data row from a context of all input data rows.

An output signal from the Viterbi decoder 216 is input to the demodulator 217. The demodulator 217 demodulates an encoded RLL signal into an original signal. The serial data that has been demodulated by the demodulator 217 is reconverted into parallel data by the serial-parallel converter 218 and then transferred to the HDC/MPU 23. The HDC/MPU 23 conducts error corrections on the transferred data and stores error-corrected data into a buffer 241, the internal buffer of the RAM 24.

The FIR filter 214 has 16 taps, for example. In contrast to this, a preferred example of the low-order FIR filter 215 connected in series to the FIR filter 214 is a cosine filter having three such tap coefficients as expressed by A=[−k, 1, −k]. The low-order FIR filter 215 according to the present embodiment has variable coefficients "k" and forms an adaptive transversal filter. Additionally, the low-order FIR filter 215 can change each of these coefficients while reading out data. The number of taps assigned to the low-order FIR filter 215 is preferably equal to or smaller than 5 in terms of stability.

Figure 3:
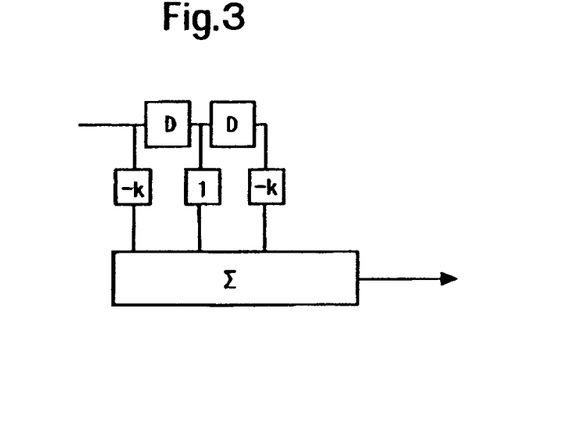
FIG. 3 is a diagram showing an example of a low-order FIR filter according to an embodiment of the present invention.

FIG. 3 shows a configuration of the cosine filter having three tap coefficients expressed by A=[−k, 1, −k]. Reference code D denotes a delay operator that delays data for one clock. Codes −k, 1, −k denote the filtering coefficients as weighting functions in taps from an input end. Two delay elements are connected in series, and an output of each delay element and an input of the delay element existing at an initial stage have a tap each. Multipliers associated with the tap coefficients [−k, 1, −k] exist for each of the taps, and outputs of the multiplication sections are added by an adder (Σ).

The filtering coefficients [−k, 1, −k] are equivalent to an impulse response of the low-order FIR filter 215. The FIR filter 214, although greater than the low-order FIR filter 215 in the number of taps and different from the low-order FIR filter 215 in tap coefficients, has essentially the same configuration as that of FIG. 3. A transfer function H(z) of a transversal FIR filter with "n" taps is expressed as "Σhnzn", where "hn" denotes tap coefficients.

The low-order FIR filter 215 controls the frequency characteristics of the input signal and reduces noise. When the low-order FIR filter 215 forms the cosine filter described above, the low-order FIR filter 215 can control the frequency characteristics since the filter 215 operates to increase low-pass frequency components and reduce high-pass frequency components, or operates to reduce low-pass frequency components and increase high-pass frequency components.

The FIR filter 214 is an adaptive transversal filter, and the tap coefficients of the FIR filter 214 are each assigned to a different value according to particular conditions of the head element section such as a zone and a temperature. More specifically, as shown in FIG. 2, the HDC/MPU 23 assigns a pre-registered tap coefficient set (COEFFICIENTS) to a register of the R/W channel 21 in accordance with an ambient temperature and an access destination. The FIR filter 214 conducts waveform equalization based on the assigned tap coefficient set.

Typically, this tap coefficient set is optimized during a manufacturing phase before the HDD 1 is shipped. The tap coefficients assigned by the HDC/MPU 23, therefore, will remain constant until the HDC/MPU 23 has updated the coefficients. Meanwhile, each tap coefficient of the low-order FIR filter 215 is controlled to take an appropriate value while user data is being read out. In the present embodiment, the Viterbi decoder 216 controls each tap coefficient of the low-order FIR filter 215. When the tap coefficients of the FIR filter 214 are assigned, the tap coefficients of the low-order FIR filter 215 also are preferably initialized. For the cosine filter, for example, 0 is assigned to "k". It is also possible to assign the tap coefficients that were optimized during the manufacturing phase.

The Viterbi decoder 216 identifies a maximum-likelihood value (ideal value) for each bit supplied from the low-order FIR filter 215. For this identification purpose, the Viterbi decoder 216 detects on a bit-by-bit basis an error between the ideal value and the signal that has been input from the low-order FIR filter 215, and assigns tap coefficients to the low-order FIR filter 215 by feedback to minimize a magnitude of the error. Even in cases such as an increase in noise due to any effects of heat or for other reasons, error rates in the error correction by the HDC/MPU 23 can be reduced by optimizing the tap coefficients of the low-order FIR filter 215 during the feedback from the Viterbi decoder 216.

The following describes error recovery procedures (ERPs) executed by the HDD 1 of the present embodiment. The HDD 1 executes a read ERP associated with the process of reading out user data from the magnetic disk 11, and a write ERP associated with the process of writing user data onto the magnetic disk 11. The HDD 1 of the present embodiment features the read ERP. The ERP in the reading process is described below. If an error occurs during the read process, the HDD 1 executes the ERP. A typical read error occurs when the HDC/MPU 23 cannot obtain accurate data by error correction.

As shown in the block diagram of FIG. 2, the HDC/MPU 23 conducts the ERP in accordance with a read ERP table 242 stored within the RAM 24. A plurality of steps (say, 256 ERP steps) are pre-registered in the read ERP table 242, and the HDC/MPU 23 sequentially executes each of the ERP steps. A typical ERP step is a read retry under the same conditions or a retry conducted after a target position of the head element section 12 has been offset through a required distance. The ERP is completed with a step in which accurate readout of the user data is successfully conducted during sequential execution of higher-order ERP steps by the HDC/MPU 23. Typically, the read ERP table 242 is saved in a management region of the magnetic disk 11.

Figure 4:
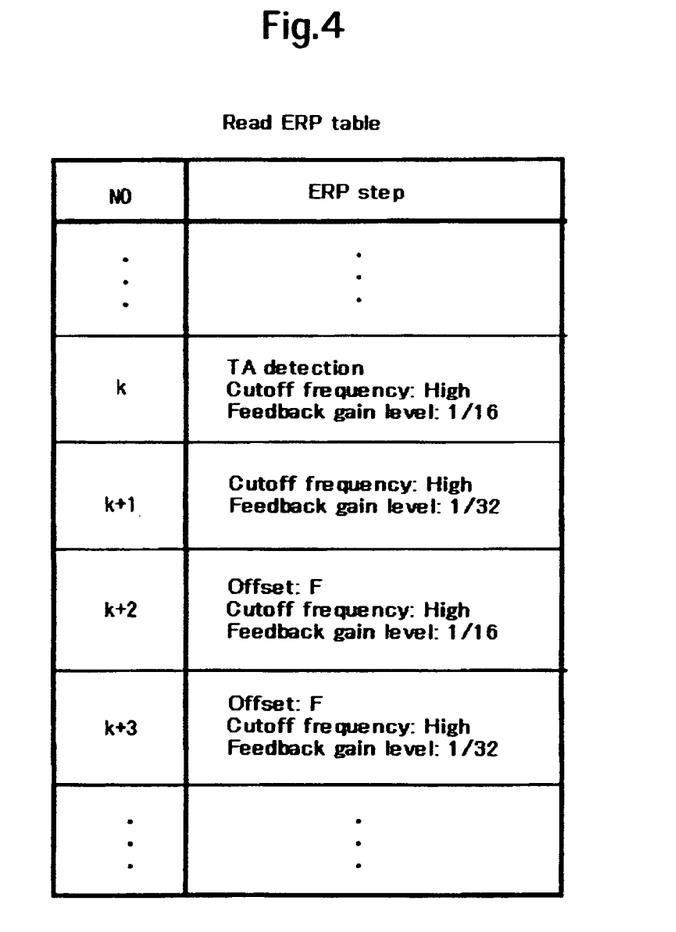
FIG. 4 is a diagram showing an example of a read ERP table according to an embodiment of the present invention.

The read ERP table 242 includes a plurality of ERP steps against TA. The ERP steps against TA are described below. FIG. 4 shows an example of execution order of the ERP steps for TA, based on the read ERP table 242. As shown in FIG. 4, each ERP step for TA is assigned in required order, in the present example, in the order from "k" to "k+3", to the read ERP table 242.

In the "k" step that is the first ERP step for TA, the HDD 1 conducts a TA position detection process. An error due to TA is typically an error in readout of one data sector. The readout of one data sector is therefore retried in this ERP step. If the error position in the sector is already identified, the HDC/MPU 23 can conduct error corrections of a highly correction capability, based on loss correction processing.

More specifically, the HDC/MPU 23 instructs the R/W channel 21 to execute a TA detection process. During the readout of the error sector, the HDC/MPU 23 asserts a control signal instructing the R/W channel 21 to read out the sector. The R/W channel 21 has a TA detection circuit (not shown), and when TA is detected, the R/W channel notifies this to the HDC/MPU 23. The HDC/MPU 23 identifies the error position in the data sector based on the assertion timing of the control signal and detection timing of TA.

Following the above identification, the HDC/MPU 23 changes a cutoff frequency of a high-pass filter within the AE 13. The AE 13 that outputs signals to the R/W channel 21 has a high-pass filter (not shown) that is an example of a low cut filter, and a low-pass filter. These filters determine which frequency band of signals are passed through the filters among all input signals to the AE 13. Low-frequency components and high-frequency components are cut off by these filters, and as a result, only signals having a required frequency band are allowed to pass through the filters.

In addition, the AE 13 has two usable cutoff frequencies for the high-pass filter. One is a first cutoff frequency that is a low frequency, and the other is a second cutoff frequency higher than the first cutoff frequency. The AE 13 can change a cutoff frequency region as required.

During normal readout of the user data, the high-pass filter is set to cut off signals at the low first cutoff frequency. In contrast to this, the "k" step for TA is conducted to increase the present cutoff frequency of the high-pass filter by changing from the low first cutoff frequency to the high second cutoff frequency. More specifically, as shown in FIG. 2, the HDC/MPU 23 assigns the cutoff frequency (CUT OFF) of the high-pass filter to the register of the AE 13. The AE 13 activates the high-pass filter at this assigned cutoff frequency.

The cutoff frequency in normal readout process is, for example, several hundreds of hertz (first cutoff frequency), and this frequency can be increased to several megahertz (second cutoff frequency) in the corresponding ERP step for TA. This makes it possible to suppress the DC frequency components of the read signal that are increased by TA.

The HDC/MPU 23 further changes a tap coefficient control feedback gain to be given from the Viterbi decoder 216 to the low-order FIR filter 215. The HDC/MPU 23 sets a feedback gain level higher than the feedback gain level obtained during normal data reading. For example, if the feedback gain level during normal reading is $1/128$, the HDC/MPU 23 sets a feedback gain level of $1/16$. The HDC/MPU 23 sets the feedback gain level by, as shown in FIG. 2, assigning an associated feedback gain value (GAIN) to a register (not shown) of the R/W channel 21 in accordance with the read ERP table 242.

During normal data reading, the feedback gain from the Viterbi decoder 216 to the low-order FIR filter 215 is set to be a small value in order to prevent system divergence. At the same time, processing in the ERP is required to be ended as quickly as possible in order to avoid deterioration of performance, furthermore, disconnection from the host 51 due to a time-out error.

That is to say, during normal processing, a small feedback gain is selected to obtain system stability, whereas, in the ERP, tap coefficient control by the low-order FIR filter 215 is required to be quickly converged. In addition, since the ERP step for TA is executed only to read out a limited number of error sectors, typically, one error sector, it is not necessary to take into consideration system divergence as much as during normal processing. Error recovery can be quickly completed in the ERP by correcting the tap coefficients of the low-order FIR filter 215 at a feedback gain level higher than during normal processing.

Increasing the cutoff frequency of the high-pass filter within the AE 13 increases high-frequency components during output from the FIR filter 214. The low-order FIR filter 215, therefore, corrects frequency characteristics so as to raise (increase) low frequency components of the output from the FIR filter 214 and lower (reduce) high frequency components of the output.

If the error sector cannot be accurately read out in ERP step "k", the HDC/MPU 23 executes next ERP step ("k+1"). In the next ERP step ("k+1"), TA detection is not conducted. In addition, the particular feedback gain level is set to be $1/32$, which is lower than in ERP step "k". Other retrial conditions are the same as for ERP step "k". If the target position remains the same, since tap coefficients have already been corrected with a great feedback gain, divergence can be avoided more reliably and convergence enhanced, by reducing the feedback gain.

If the error sector cannot be accurately read out in ERP step "k+1", the HDC/MPU 23 executes next ERP step ("k+2"). In the next ERP step ("k+2"), the target head position differs from that of ERP step "k". In ERP step "k+2", an offset F exists for normal target position. The feedback gain level in ERP step "k+2" is set to be $1/16$, which is higher than in ERP step "k+1".

The target position in ERP step "k+2" differs from that of ERP step "k+1". Since the signal read out is expected to change significantly in such a case, quick convergence is expected by increasing the feedback gain. If the error sector cannot be accurately read out in ERP step "k+2", the HDC/MPU 23 executes next ERP step ("k+3"). A relationship between ERP step "k+3" and ERP step "k+2" is the same as that of ERP steps "k+1" and "k".

After the user data has been accurately read out in any one of the above ERP steps, the HDC/MPU 23 completes the ERP. In this case, the HDC/MPU 23 then returns the cutoff frequency of the high-pass filter within the AE 13 to the original low value (in the above example, the first cutoff frequency). The HDC/MPU 23 also returns the feedback gain to a normal value (in the above example, $1/128$). If the error sector cannot be accurately read out in ERP step "k+3", the HDC/MPU 23 executes next ERP step.

In the HDD 1 described above, since the cutoff frequency of the high-pass filter is increased in the ERP step against TA and since the cosine filter having a smaller number of taps is used to raise a loop gain of this filter, it is possible to reduce the time required for completion of noise convergence and thus achieve stable and fast error recovery, compared with a case in which the cosine filter is not used. Each coefficient of the low-order FIR filter 215 is preferably initialized at the completion of the ERP.

Figure 5:
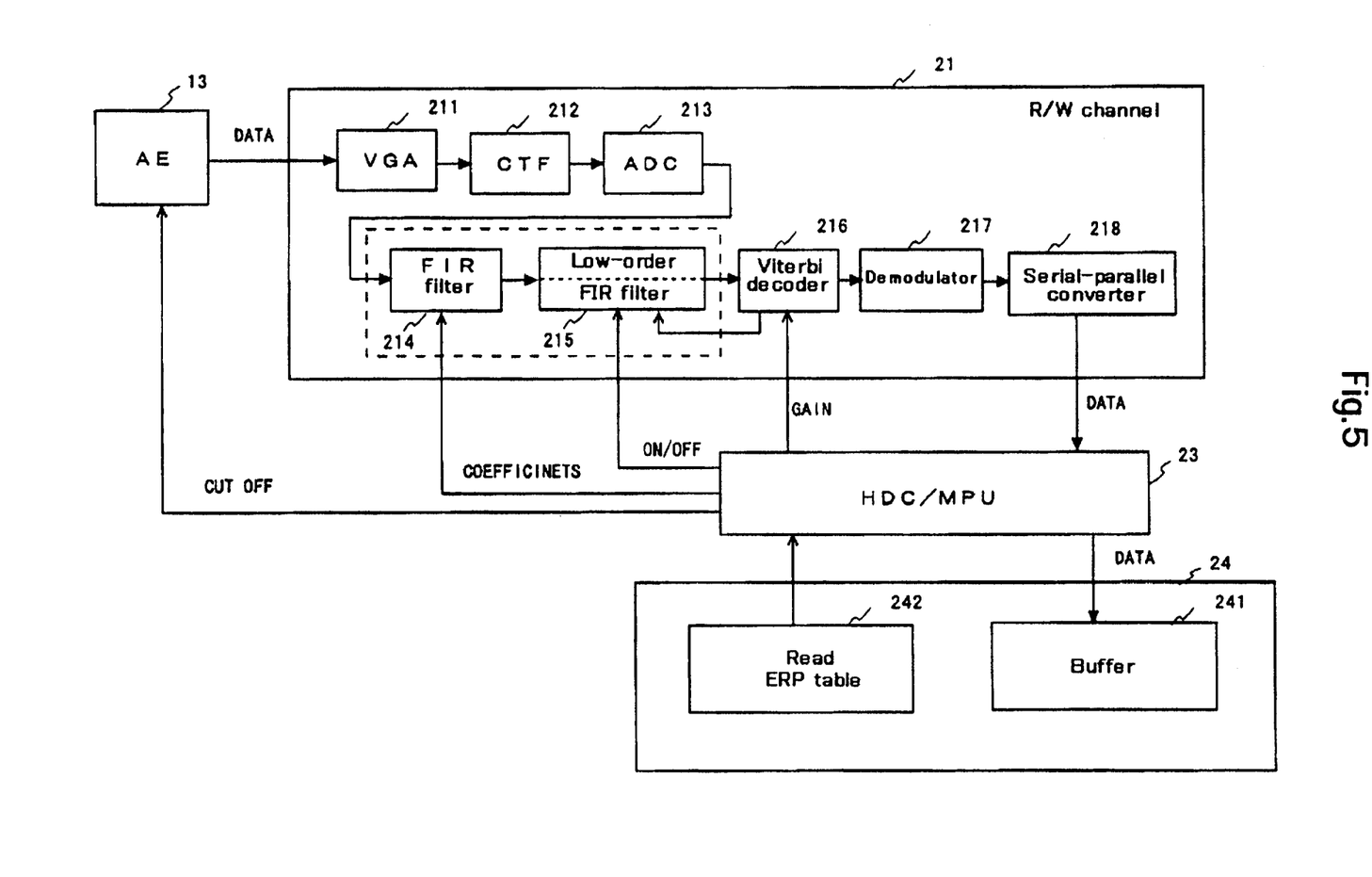
FIG. 5 is a block diagram schematically showing another logical configuration associated with the readout process according to an embodiment of the present invention.

In the example described above, the low-order FIR filter 215 is in operation during a normal data read process. In the ERP, however, the HDD 1 can use the low-order FIR filter 215 without using this filter during the normal data process. As shown in FIG. 5, the HDC/MPU 23 controls an ON/OFF state of the low-order FIR filter 215. During the normal data process, the HDC/MPU 23 sets the low-order FIR filter 215 to the OFF state. More specifically, the HDC/MPU 23 assigns 1 as one of the tap coefficients of the low-order FIR filter 215 to the register (not shown) of the R/W channel 21, and assigns 0 as all other tap coefficients. The low-order FIR filter 215 is thus set to the OFF state (a disconnected state).

The HDC/MPU 23 sets the low-order FIR filter 215 to the ON state in a specific ERP step of the ERP. For instance, in the example described referring to FIG. 4, the HDC/MPU 23 operates the low-order FIR filter 215 in ERP step "k". In this case, other conditions can be as shown in FIG. 4. Similarly, the low-order FIR filter 215 operates in ERP steps "k+1" to "k+3". The HDC/MPU 23 sets the low-order FIR filter 215 to the ON state (a connected state) by assigning preset initial data to the register (not shown) of the R/W channel 21.

The present invention is not limited to the particular embodiment mentioned above, and it goes without saying that various changes can be made to the invention without departing from the gist thereof. While a cosine filter with three taps is used as the low-order FIR filter in the above embodiment, the use of this cosine filter is not limited in the present invention and any other transversal filter with a smaller number of taps may be used. Application of the invention is not limited to digital filters.

While embodiments in accordance with the present invention are particularly useful for the control of filtering coefficients for TA, embodiments of the invention may also be used to control any filtering coefficients intended for other purposes. Embodiments of the invention, although particularly suitable for an HDD of the perpendicular magnetic recording type, may also be applied to an HDD of the planar recording type. The connecting position of the low-order FIR filter is not limited to a post stage of another FIR filter. Although the R/W channel preferably includes two FIR filters, controlling part of the filtering coefficients of one FIR filter makes it possible to obtain an effect similar to that obtained by controlling the filtering coefficients of the low-order FIR filter.

What is claimed is:

1. A disk drive comprising:
a head that reads out data from a disk;
a low cut filter that selectively uses a first cutoff frequency and a second cutoff frequency, and that cuts off part of a signal transmitted from the head;
a waveform control filter that has a plurality of filtering coefficients, and that controls a waveform of a signal transmitted from the low cut filter, wherein the waveform control filter comprises a first FIR filter and a second FIR filter which has a smaller number of taps than the first FIR filter; and
a filtering coefficient controller that controls the filtering coefficients of the waveform control filter in accordance with a signal from the waveform control filter and controls a filtering coefficient of the second FIR filter;
wherein:
when the low cut filter uses the first cutoff frequency, the filtering coefficient controller controls part of the plurality of the filtering coefficients at a first feedback gain level; and
when the low cut filter uses the second cutoff frequency, the filtering coefficient controller controls the part of the plurality of the filtering coefficients at a second feedback gain level higher than the first feedback gain level.

2. The disk drive according to claim 1, wherein the filtering coefficient controller performs a decoding process on the signal from the waveform control filter and controls the filtering coefficients of the waveform control filter in accordance with decoding results.

3. The disk drive according to claim 1, wherein:
during normal data readout from the disk, the low cut filter uses the first cutoff frequency; and
during an error recovery process, the low cut filter uses the second cutoff frequency.

4. The disk drive according to claim 1, wherein:
the number of taps in the second FIR filter is equal to or smaller than 5.

5. The disk drive according to claim 1, wherein:
the second cutoff frequency is higher than the first cutoff frequency.

6. A disk drive comprising:
a head that reads out data from a disk~
a low cut filter that selectively uses a first cutoff frequency and a second cutoff frequency, and that cuts off part of a signal transmitted from the head; and
a waveform control filter that has a plurality of filtering coefficients, and that controls a waveform of a signal transmitted from the low cut filter, wherein the waveform control filter comprises a first FIR filter and a second FIR filter which has a smaller number of taps than the first FIR filter;
wherein:
when the low cut filter uses the first cutoff frequency, the plurality of filtering coefficients are fixed during data readout from the disk; and
when the low cut filter uses the second cutoff frequency, part of the plurality of the filtering coefficients are controlled during readout of data from the disk, wherein the part of the filtering coefficients is a filtering coefficient of the second FIR filter.

7. The disk drive according to claim 6, wherein, when the low cut filter uses the first cutoff frequency, the second FIR filter is in an "off" state.

8. The disk drive according to claim 6, wherein:
during normal data readout from the disk, the low cut filter uses the first cutoff frequency; and
during an error recovery process, the low cut filter uses the second cutoff.

9. The disk drive according to claim 6, wherein:
the number of taps in the second FIR filter is equal to or smaller than 5.

10. The disk drive according to claim 6, wherein:
the second cutoff frequency is higher than the first cutoff frequency.

* * * * *